United States Patent
Akamine et al.

(10) Patent No.: US 11,002,843 B2
(45) Date of Patent: May 11, 2021

(54) RADAR DEVICE

(71) Applicant: DENSO CORPORATION, Kariya (JP)

(72) Inventors: Yusuke Akamine, Nisshin (JP);
Mitsuyasu Matsuura, Nisshin (JP);
Yasuyuki Miyake, Kariya (JP)

(73) Assignee: DENSO CORPORATION, Aichi-pref (JP)

( * ) Notice: Subject to any disclaimer, the term of this patent is extended or adjusted under 35 U.S.C. 154(b) by 310 days.

(21) Appl. No.: 16/315,291

(22) PCT Filed: Jul. 7, 2017

(86) PCT No.: PCT/JP2017/025020
§ 371 (c)(1),
(2) Date: Jan. 4, 2019

(87) PCT Pub. No.: WO2018/008751
PCT Pub. Date: Jan. 11, 2018

(65) Prior Publication Data
US 2019/0212430 A1    Jul. 11, 2019

(30) Foreign Application Priority Data
Jul. 8, 2016   (JP) .............................. JP2016-136095

(51) Int. Cl.
*G01S 13/34* (2006.01)
*G08G 1/16* (2006.01)
(Continued)

(52) U.S. Cl.
CPC ............ *G01S 13/341* (2013.01); *G01S 7/352* (2013.01); *G01S 13/345* (2013.01);
(Continued)

(58) Field of Classification Search
CPC ...... G01S 13/341; G01S 7/352; G01S 13/345; G01S 13/347; G01S 13/87; G01S 13/931; G01S 2013/932; G08G 1/166
See application file for complete search history.

(56) References Cited

U.S. PATENT DOCUMENTS 6,646,589 B2 * 11/2003 Natsume ............... G01S 13/584
                                                        342/70
9,250,318 B2 *  2/2016 Izumi .................... G01S 13/345
(Continued)

FOREIGN PATENT DOCUMENTS

JP     H06-214017 A     8/1994
JP     2002-071793 A    3/2002
(Continued)

OTHER PUBLICATIONS

Fan Yuanzhang et al., "A New Method of Multi-Target Detection for FMCW Automotive Radar", In: IET International Radar Conference, 2013, vol. 3, p. 1583-1586.

*Primary Examiner* — Peter M Bythrow
(74) *Attorney, Agent, or Firm* — Maschoff Brennan

(57) ABSTRACT

A dual-frequency CW processing unit (12) calculates an observation-point orientation of an observation point. An FMCW processing unit (11) calculates at least a power spectrum of a beat signal, which has been generated based on radar waves that have come from the calculated observation-point orientation, in terms of an up-modulation time interval and a down-modulation time interval (termed orientation power spectrum hereinafter). The FMCW processing unit (11) shifts the orientation power spectra of the up- and down-modulation time intervals to positive and negative directions, respectively, by an amount corresponding to a Doppler shift frequency. The FMCW processing unit (11) calculates a differential power spectrum by differentiating the orientation power spectra of the shifted up- and down-modulation time intervals, and detects a peak frequency where intensity is maximum.

6 Claims, 8 Drawing Sheets

(51) Int. Cl.
  *G01S 13/87* (2006.01)
  *G01S 7/35* (2006.01)
  *G01S 13/931* (2020.01)

(52) U.S. Cl.
  CPC ............ *G01S 13/347* (2013.01); *G01S 13/87* (2013.01); *G01S 13/931* (2013.01); *G08G 1/166* (2013.01); *G01S 2013/932* (2020.01)

(56) References Cited

U.S. PATENT DOCUMENTS

| | | | |
|---|---|---|---|
| 9,360,548 B2* | 6/2016 | Kato | G01S 7/023 |
| 2004/0252047 A1* | 12/2004 | Miyake | G01S 13/34 |
| | | | 342/107 |
| 2009/0085796 A1* | 4/2009 | Kuroda | G01S 7/354 |
| | | | 342/129 |
| 2011/0084872 A1* | 4/2011 | Kishida | G01S 13/345 |
| | | | 342/146 |
| 2012/0229323 A1* | 9/2012 | Kato | G01S 13/345 |
| | | | 342/27 |
| 2014/0002296 A1* | 1/2014 | Izumi | G01S 13/345 |
| | | | 342/149 |
| 2015/0355321 A1* | 12/2015 | Yukumatsu | G01S 13/343 |
| | | | 342/27 |
| 2017/0160391 A1* | 6/2017 | Satou | G01S 13/536 |
| 2017/0176585 A1* | 6/2017 | Satou | G01S 13/931 |

FOREIGN PATENT DOCUMENTS

| | | |
|---|---|---|
| JP | 2006-038687 A | 2/2006 |
| JP | 2007-155396 A | 6/2007 |

\* cited by examiner

RADAR DEVICE

CROSS REFERENCE TO RELATED APPLICATIONS

This application is the U.S. national phase of International Application No. PCT/JP2017/025020, filed Jul. 7, 2017, which designated the U.S. and claims priority to Japanese Patent Application No. 2016-136095, filed Jul. 8, 2016, the contents of which are incorporated herein by reference.

TECHNICAL FIELD

The present disclosure relates to a radar device that detects objects around the vehicle.

BACKGROUND ART

As disclosed in Patent Literature 1, for example, there have been known moving object detection devices which offset the transmission frequency spectrum between a frequency-increasing period and a frequency-decreasing period, and detect a moving object based on the frequency spectrum obtained by calculating a difference between the two offset frequency spectra.

CITATION LIST

Patent Literature

[PTL 1] JP 2006-38687 A

SUMMARY OF THE INVENTION

However, through intensive studies, the inventors have found a problem with the technique described in Patent Literature 1. Specifically, since an amount of the offset varies depending on an orientation of the object as viewed from an own vehicle, the frequency spectrum needs to be offset for each orientation and thus the processing load involved in detecting the moving object increases.

The present disclosure has been made to reduce a processing load of detecting a moving object.

According an aspect of the present disclosure, there is provided a radar device installed in a vehicle to detect at least one object around the vehicle. The radar device of the present disclosure includes a first transmission unit, a first reception unit, a first-spectrum calculation unit, a second transmission unit, a second reception unit, and a second-spectrum calculation unit. Further, the radar device of the present disclosure includes an orientation calculation unit, a shift amount calculation unit, an orientation-spectrum calculation unit, a shifting unit, a differential spectrum calculation unit, and a peak detection unit.

The first transmission unit is configured to transmit first radar waves that are modulated in frequency so that a preset first-modulation cycle includes an up-modulation time interval for gradually increasing frequency over time, and a down-modulation time interval for gradually decreasing frequency over time.

The first reception unit is configured to receive the first radar waves transmitted from the first transmission unit and reflected by the object, and is configured to generate a first beat signal by mixing the received first radar waves with the first radar waves transmitted by the first transmission unit.

The first-spectrum calculation unit is configured to perform frequency analysis of the first beat signal generated by the first reception unit to calculate a first power spectrum indicating correlation between a frequency contained in the first beat signal and intensity of the frequency.

The second transmission unit is configured to transmit second radar waves that are modulated in frequency so that a preset second-modulation cycle includes a first modulation time interval with a frequency set to a first modulation frequency, and a second modulation time interval with a frequency set to a second modulation frequency.

The second reception unit is configured to receive the second radar waves transmitted from the second transmission unit and reflected by the object, and generate a second beat signal by mixing the received second radar waves with the second radar waves transmitted by the second transmission unit.

The second-spectrum calculation unit is configured to perform frequency analysis of the second beat signal generated by the second reception unit to calculate a second power spectrum indicating correlation between a frequency contained in the second beat signal and intensity of the frequency.

The orientation calculation unit is configured to use the second power spectrum generated by the second-spectrum calculation unit as a basis to calculate an object orientation of the object that has reflected the second radar waves.

The shift amount calculation unit is configured to calculate a shift amount in frequency due to the Doppler effect, based on a traveling speed of the vehicle and the object orientation calculated by the orientation calculation unit.

The orientation-spectrum calculation unit is configured to use the first power spectrum calculated by the first-spectrum calculation unit as a basis to calculate at least an orientation power spectrum for each of the up-modulation time interval and the down-modulation time interval. The orientation power spectrum indicates correlation between a frequency contained in the first beat signal and intensity of the frequency, the first beat signal having been generated based on the first radar waves arrived from the object orientation calculated by the orientation calculation unit.

The shifting unit is configured to shift the orientation power spectrum of the up-modulation time interval calculated by the orientation-spectrum calculation unit in a positive frequency direction by an amount corresponding to the shift amount calculated by the shift amount calculation unit, and shift the orientation power spectrum of the down-modulation time interval calculated by the orientation-spectrum calculation unit in a negative frequency direction by an amount corresponding to the shift amount calculated by the shift amount calculation unit.

The differential spectrum calculation unit is configured to calculate a differential power spectrum obtained by differentiating the orientation power spectrum of the up-modulation time interval after being shifted by the shifting unit and the orientation power spectrum of the down-modulation time interval after being shifted by the shifting unit.

The peak detection unit is configured to detect a peak frequency of maximum intensity in the differential power spectrum calculated by the differential spectrum calculation unit.

The radar device of the present disclosure configured as described above receives the second radar waves reflected by an object and calculates an object orientation of the object that have reflected the second radar waves by using the second power spectrum of the second beat signal. Thus, the radar device of the present disclosure can specify the orientation of the object that has reflected the first radar waves. Thereby, even when the radar device of the present disclosure calculates a power spectrum indicating correlation between a frequency contained in the first beat signal and the intensity of the frequency for each of the plurality of orientations different from each other, the shifting unit needs to process only the power spectrum of the calculated object orientation (i.e., the orientation power spectrum). In this way, the radar device of the present disclosure can reduce the processing load of detecting a moving object.

DESCRIPTION OF EMBODIMENTS

With reference to the drawings, an embodiment of the present disclosure will be described.

Figure 1:
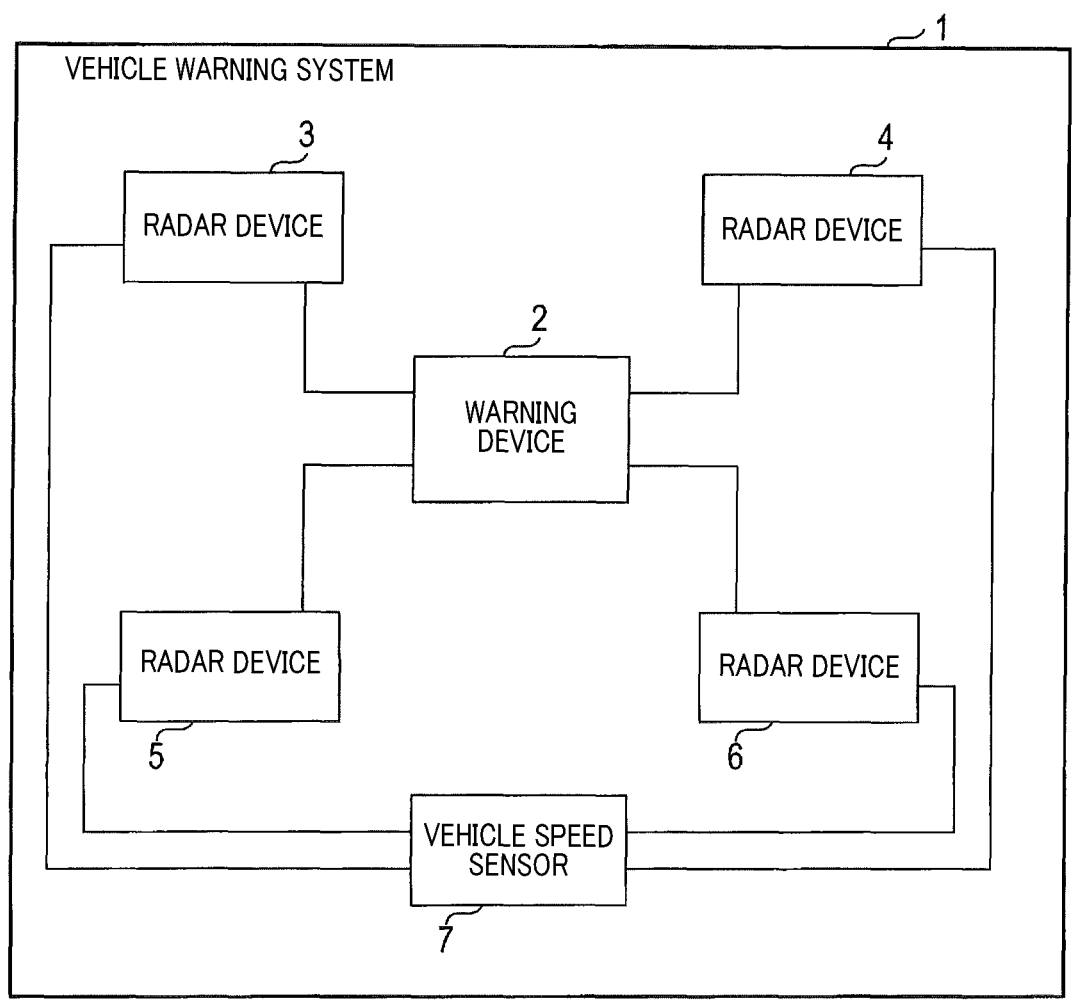
FIG. 1 is a block diagram illustrating a configuration of a vehicle warning system 1.

As shown in FIG. 1, a vehicle warning system 1 according to the present embodiment includes a warning device 2, radar devices 3, 4, 5, and 6, and a vehicle speed sensor 7.

The warning device 2 is an audio output device provided in a cabin of a vehicle, in which the vehicle warning system 1 is installed (hereinafter referred to as an own vehicle), to issue warning to occupants of the vehicle.

The radar devices 3, 4, 5, and 6 transmit radar waves and receive the reflected radar waves. With this configuration, the radar devices 3, 4, 5, and 6 each detect the reception intensity of the received radar waves, the distance to the point at which the radar waves have been reflected (hereinafter the distance is referred to as observation-point distance, and the point is referred to as observation point), the speed relative to the observation point (hereinafter referred to as observation-point relative speed), and the orientation of the observation point (hereinafter referred to as observation-point orientation). The radar devices 3 to 6 each output observation-point information indicating the detected reception intensity, observation-point distance, observation-point relative speed, and observation-point orientation to the warning device 2. The radar devices 3, 4, 5, and 6 are provided respectively to the front left end, the front right end, the rear left end, and the rear right end of the own vehicle.

The vehicle speed sensor 7 detects the traveling speed of the own vehicle, and outputs a detected signal indicating the traveling speed of the own vehicle to the radar devices 3, 4, 5, and 6.

Figure 2:
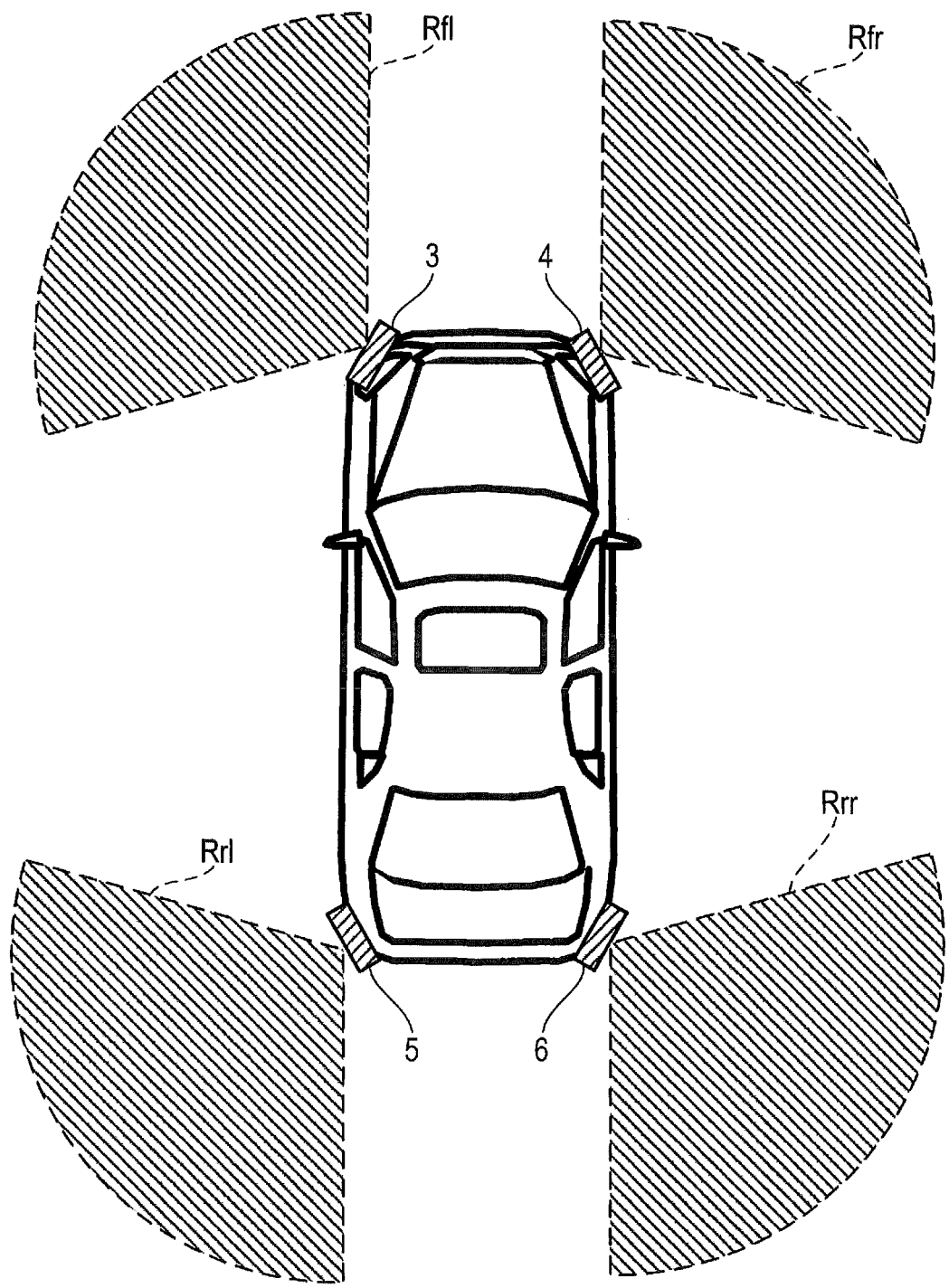
FIG. 2 is a diagram illustrating installation positions of radar devices 3, 4, 5, and 6 and object detection regions.

As shown in FIG. 2, the radar device 3 transmits the radar waves forward left of the own vehicle so as to detect a vehicle present in an object detection region Rfl. The radar device 4 transmits the radar waves forward right of the own vehicle so as to detect a vehicle present in an object detection region Rfr. The radar device 5 transmits the radar waves rearward left of the own vehicle so as to detect a vehicle present in an object detection region Rrl. The radar device 6 transmits the radar waves rearward right of the own vehicle so as to detect a vehicle present in an object detection region Rrr.

Figure 3:
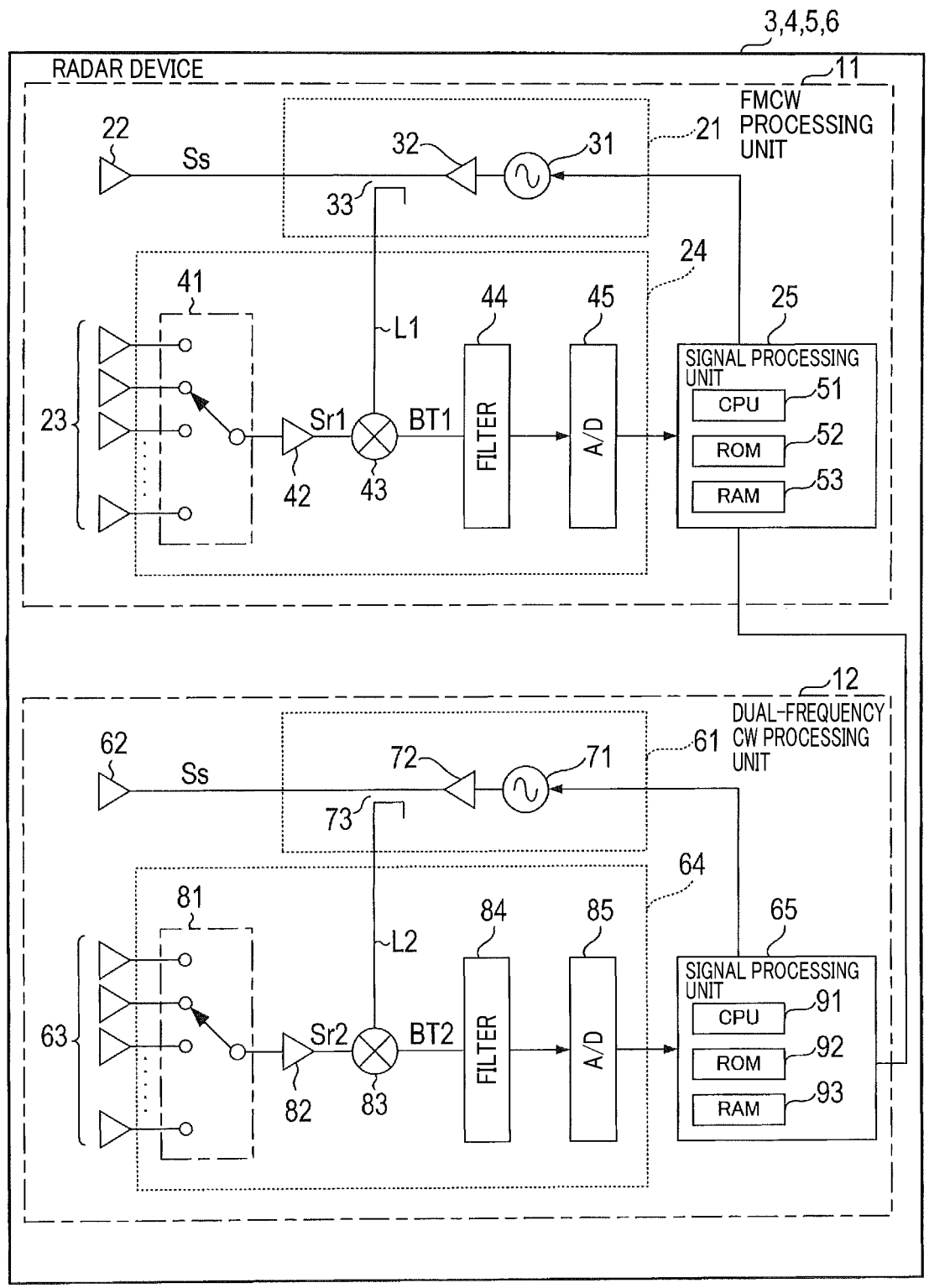
FIG. 3 is a block diagram illustrating configurations of an FMCW processing unit 11 and a dual-frequency CW processing unit 12.

As shown in FIG. 3, the radar devices 3, 4, 5, and 6 each include an FMCW processing unit 11 and a dual-frequency CW processing unit 12.

The FMCW processing unit 11 includes a transmission circuit 21, a transmission antenna 22, a reception antenna 23, a reception circuit 24, and a signal processing unit 25.

The transmission circuit 21 supplies a transmission signal Ss1 to the transmission antenna 22, and includes an oscillator 31, an amplifier 32, and a distributor 33. The oscillator 31 generates and outputs a high-frequency signal of a millimeter-wave band. In this case, this signal is modulated to include an up-modulation time interval in which the frequency linearly increases over time and a down-modulation time interval in which the frequency linearly decreases over time. The amplifier 32 amplifies the high-frequency signal outputted from the oscillator 31. The distributor 33 distributes power of the signal outputted from the amplifier 32 into a transmission signal Ss1 and a local signal L1.

Based on the transmission signal Ss1 supplied from the transmission circuit 21, the transmission antenna 22 radiates radar waves at a frequency corresponding to the transmission signal Ss1. Thus, radar waves of linearly increasing frequency and the radar waves of linearly decreasing frequency are outputted alternately.

The reception antenna 23 is an array antenna constituted by arranging a plurality of antenna elements in an array.

The reception circuit 24 includes a reception switch 41, an amplifier 42, a mixer 43, a filter 44, and an A/D converter 45.

The reception switch 41 sequentially selects one of the plurality of antenna elements constituting the reception antenna 23, and outputs a received signal Sr1 of the selected antenna element to the amplifier 42.

The amplifier 42 amplifies the received signal Sr1 inputted from the reception switch 41, and outputs the amplified received signal Sr1 to the mixer 43.

The mixer 43 mixes the received signal Sr1 amplified by the amplifier 42 with the local signal L1 to produce a beat signal BT1.

The filter 44 removes unnecessary signal components from the beat signal BT1 produced by the mixer 43.

The A/D converter 45 samples the beat signal BT1 outputted from the filter 44 for conversion into digital data, and outputs the digital data to the signal processing unit 25.

The signal processing unit 25 is an electronic control unit constituted mainly by a known microcomputer including a CPU 51, a ROM 52, and a RAM 53. The microcomputer has various functions which are implemented by the CPU 51 executing a program stored in a non-transitory tangible recording medium. In this example, the ROM 52 corresponds to the non-transitory tangible recording medium storing the program. By executing the program, a method corresponding to the program is executed. When the CPU 51 executes processing according to the program stored in the ROM 52, the signal processing unit 25 analyzes signals, or controls the operation of the FMCW processing unit 11.

Specifically, the signal processing unit 25 controls the transmission circuit 21 such that the radar waves of the up-modulation time interval are radiated alternately with the radar waves of the down-modulation time interval from the transmission antenna 22 at a modulation cycle Tm. The signal processing unit 25 causes the reception circuit 24 to sample the beat signal BT1 of each of the plurality of antenna elements constituting the reception antenna 23. Then, the signal processing unit 25 analyzes the sampled data of the beat signal BT1 to measure the distance to the observation point, the speed relative to the observation point, and the orientation of the observation point.

In the FMCW system, an up-beat signal and a down beat signal is generated as the beat signal BT1. The up-beat signal is generated by mixing a received signal Sr1 with a local signal L1 during transmission of the radar waves of the up-modulation time interval. Likewise, the down beat signal is generated by mixing a received signal Sr1 with a local signal L1 during transmission of the radar waves of the down-modulation time interval.

Thus, relationships expressed by the following Equations (1) and (2) are established. Specifically, these Equations express relationships of a frequency fbu of the up-beat signal and a frequency fbd of the down beat signal, with a distance to the observation point (hereinafter referred to as observation-point distance L) and a relative speed v (hereinafter referred to as observation-point relative speed v). In the Equations (1) and (2), c is the speed of light, Δf is a frequency variation range of the transmission signal Ss1, and f0 is a center frequency of the transmission signal Ss1.

[Math. 1]

$$fbu = \frac{4 \times \Delta f \times L}{c \times Tm} - \frac{2 \times f0 \times v}{c} \quad (1)$$

$$fbd = \frac{4 \times \Delta f \times L}{c \times Tm} - \frac{2 \times f0 \times v}{c} \quad (2)$$

Accordingly, the observation-point distance L and the observation-point relative speed v are calculated from the following Equations (3) and (4).

[Math. 2]

$$L = \frac{c \times Tm}{8 \times \Delta f}(fbu + fbd) \quad (3)$$

$$v = \frac{c \times Tm}{4 \times \Delta f}(fbu - fbd) \quad (4)$$

The dual-frequency CW processing unit 12 includes a transmission circuit 61, a transmission antenna 62, a reception antenna 63, a reception circuit 64, and a signal processing unit 65.

The transmission circuit 61 supplies a transmission signal Ss2 to the transmission antenna 62, and includes an oscillator 71, an amplifier 72, and a distributor 73. The oscillator 71 is a device that generates a high-frequency signal of a millimeter-wave band. Specifically, the oscillator 71 generates and outputs at short time intervals a high-frequency signal of a first modulation frequency f1, alternately with a high-frequency signal of a second modulation frequency f2 slightly different from the first modulation frequency f1. The amplifier 72 amplifies the high-frequency signal outputted from the oscillator 71. The distributor 73 distributes power of the signal outputted from the amplifier 72 into a transmission signal Ss2 and a local signal L2.

Based on the transmission signal Ss2 supplied from the transmission circuit 61, the transmission antenna 62 radiates radar waves at a frequency corresponding to the transmission signal Ss2. Thus, radar waves at the first modulation frequency f1 and radar waves at the second modulation frequency f2 are outputted alternately.

The reception antenna 63 is an array antenna constituted by arranging a plurality of antenna elements in an array.

The reception circuit 64 includes a reception switch 81, an amplifier 82, a mixer 83, a filter 84, and an A/D converter 85.

The reception switch 81 sequentially selects one of the plurality of antenna elements constituting the reception antenna 63, and outputs a received signal Sr2 of the selected antenna element to the amplifier 82.

The amplifier 82 amplifies the received signal Sr2 inputted from the reception switch 81, and outputs the amplified received signals Sr2 to the mixer 83.

The mixer 83 mixes the received signal Sr2 amplified by the amplifier 82 with the local signal L2 to produce a beat signal BT2.

The filter 84 removes unnecessary signal components from the beat signal BT2 produced by the mixer 83.

The A/D converter 85 samples the beat signal BT2 outputted from the filter 84 for conversion into digital data, and outputs the digital data to the signal processing unit 65.

The signal processing unit 65 is an electronic control unit constituted mainly by a known microcomputer including a CPU 91, a ROM 92, and a RAM 93. The microcomputer has various functions which are implemented by the CPU 91 executing a program stored in a non-transitory tangible recording medium. In this example, the ROM 92 corresponds to the non-transitory tangible recording medium storing the program. By executing the program, a method corresponding to the program is executed. When the CPU 91 executes processing according to the program stored in the ROM 92, the signal processing unit 65 analyzes signals, or controls the operation of the dual-frequency CW processing unit 12.

Specifically, the signal processing unit 65 controls the transmission circuit 61 such that the radar waves of the first modulation frequency f1 and the second modulation frequency f2 are alternately radiated from the transmission antenna 62 at a preset modulation cycle. The signal processing unit 65 causes the reception circuit 64 to sample the beat signal BT2 of each of the plurality of antenna elements constituting the reception antenna 63. Then, the signal processing unit 65 analyzes the sampled data of the beat signals BT2 to measure the observation-point distance, the observation-point relative speed, and the observation-point orientation, and output the information indicating the measurements to the FMCW processing unit 11.

In the dual-frequency CW system, a first-modulation beat signal and a second-modulation beat signal are generated as the beat signal BT2. The first-modulation beat signal is generated by mixing a received signal Sr2 of the first modulation frequency f1 with a local signal L2 of the first modulation frequency f1. Likewise, the second-modulation beat signal is generated by mixing a signal Sr2 of the second modulation frequency f2 with a local signal L2 of the second modulation frequency f2.

Thus, relationships expressed by the following Equations (5) and (6) are established. Specifically, these Equations show relationships of a frequency fb1 of the first-modulation beat signal and a frequency fb2 of the second-modulation beat signal, with the observation-point relative speed v.

$$fb1 = (2v/c) \times f1 \quad (5)$$

$$fb2 = (2v/c) \times f2 \quad (6)$$

In other words, in the dual-frequency CW system, an observation-point relative speed is measured based on the frequency of the generated beat signal.

Further, as is known, in a dual-frequency CW system, an observation-point distance is calculated based on the phase difference between the first- and second-modulation beat signals. It should be noted that, in a dual-frequency CW system, the observation-point relative speed is obtained from the frequency information of a received signal, whereas the observation-point distance is obtained from the phase information of a received signal. Thus, in the dual-frequency CW system, the accuracy in distance measurement is significantly lower than the accuracy in speed measurement.

In the vehicle warning system 1 configured as described above, the signal processing units 25 and 65 each execute an observation-point-information generation process It should be noted that part or all of functions to be executed by the signal processing units 25 and 65 may be provided in the form of hardware, such as one or more integrated circuits. The observation-point-information generation process performed by the signal processing unit 25 is iterated while the signal processing unit 25 is activated. The observation-point-information generation process performed by the signal processing unit 65 is iterated while the signal processing unit 65 is activated.

First, the observation-point-information generation process to be executed by the signal processing unit 65 will be described.

Figure 4:
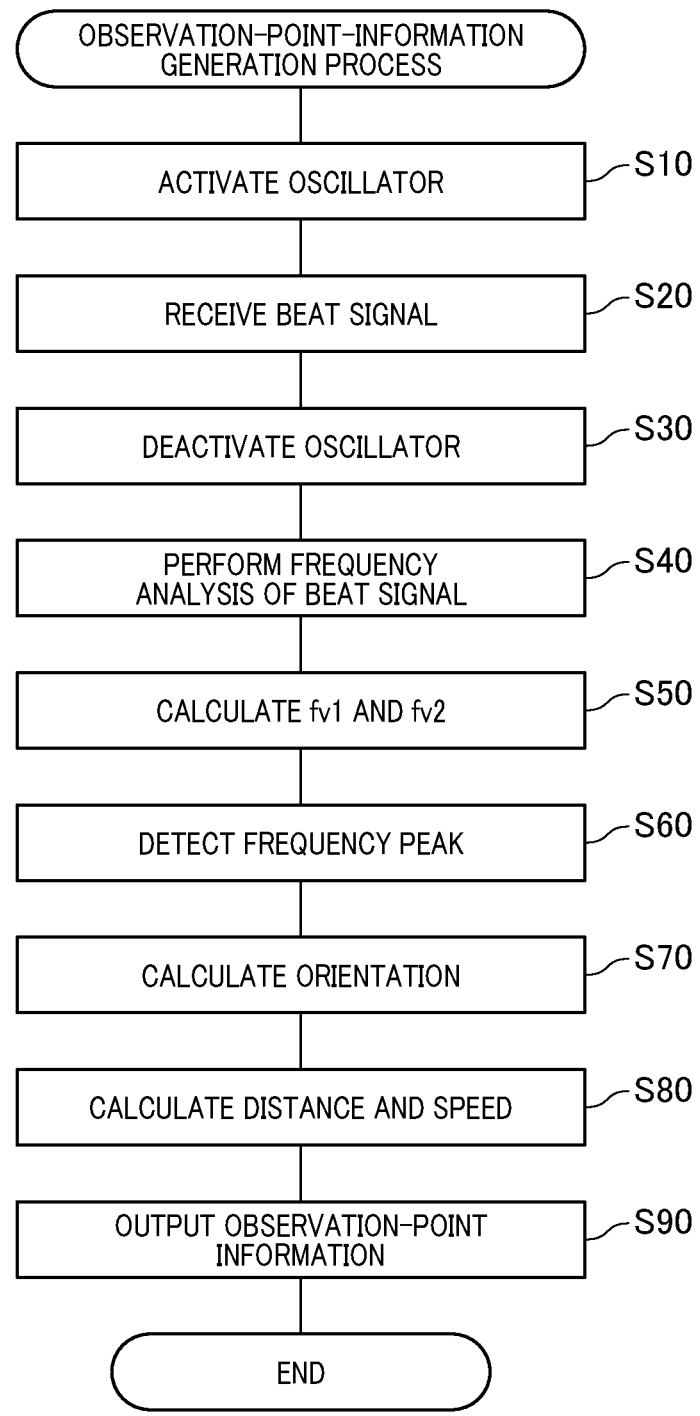
FIG. 4 is a flowchart illustrating an observation-point-information generation process performed by a signal processing unit 65.

As shown in FIG. 4, upon start of the observation-point-information generation process, the signal processing unit 65 activates the oscillator 71 first at S10 to start transmission of radar waves. Then, at S20, the signal processing unit 65 samples and acquires the beat signal BT2 outputted from the A/D converter 85 until lapse of one cycle which is constituted of a first modulation time interval having the first modulation frequency f1 and a second modulation time interval having the second modulation frequency f2. Next, after lapse of one cycle constituted of the first and second modulation time intervals, the signal processing unit 65 deactivates, at S30, the oscillator 71 to stop transmission of radar waves.

Then, at S40, the signal processing unit 65 executes a frequency analysis process for the sampled data received at S20 to calculate a power spectrum of the first-modulation beat signal and a power spectrum of the second-modulation beat signal. These power spectra indicate the frequencies contained in the first- and second-modulation beat signals, and the intensities at these frequencies. In the present embodiment, the frequency analysis process corresponds to a fast Fourier transform.

Then, at S50, the signal processing unit 65 calculates the traveling speed of the own vehicle based on the detected signal derived from the vehicle speed sensor 7, and also calculates the frequencies fb1 and fb2 corresponding to the traveling speed of the own vehicle using the Equations (5) and (6). In the following, the frequencies fb1 and fb2 corresponding to the traveling speed of the own vehicle are respectively referred to as own-vehicle-speed frequencies fv1 and fv2.

Figure 5:
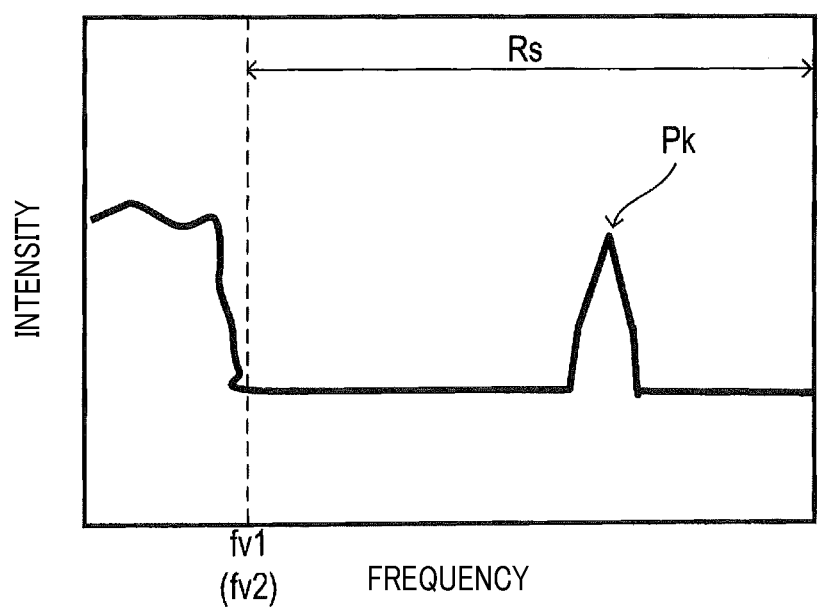
FIG. 5 is a graph illustrating a power spectrum of first- and second-modulation beat signals.

Further, at S60, the signal processing unit 65 detects one or more frequency peaks for each of the power spectra of the first- and second-modulation beat signals. Specifically, as shown in FIG. 5, the signal processing unit 65 detects a frequency peak higher than the own-vehicle-speed frequency fv1, for the power spectrum of the first-modulation beat signal. Likewise, the signal processing unit 65 detects a frequency peak higher than the own-vehicle-speed frequency fv2, for the power spectrum of the second-modulation beat signal. In FIG. 5, the search range Rs corresponds to a frequency range where frequency peaks are detected, and the peak Pk corresponds to the frequency peak detected at S60.

After completion of the process of S60, as shown in FIG. 4, the signal processing unit 65 uses, at S70, the information on a phase difference between signal components as a basis for calculating an observation-point orientation to be specified by the peak frequency, for each frequency peak detected at S60. The signal components in this case are acquired from the plurality of antenna elements constituting the reception antenna 63 and have an identical peak frequency.

Further, at S80, the signal processing unit 65 calculates an observation-point distance and an observation-point relative speed by a known technique related to the dual-frequency CW system. Then, at S90, the signal processing unit 65 outputs observation-point information indicating the observation-point distance, the observation-point relative speed, and the observation-point orientation to the FMCW processing unit 11, and then temporarily terminates the observation-point-information generation process.

The following description addresses the observation-point-information generation process to be executed by the signal processing unit 25.

Figure 6:
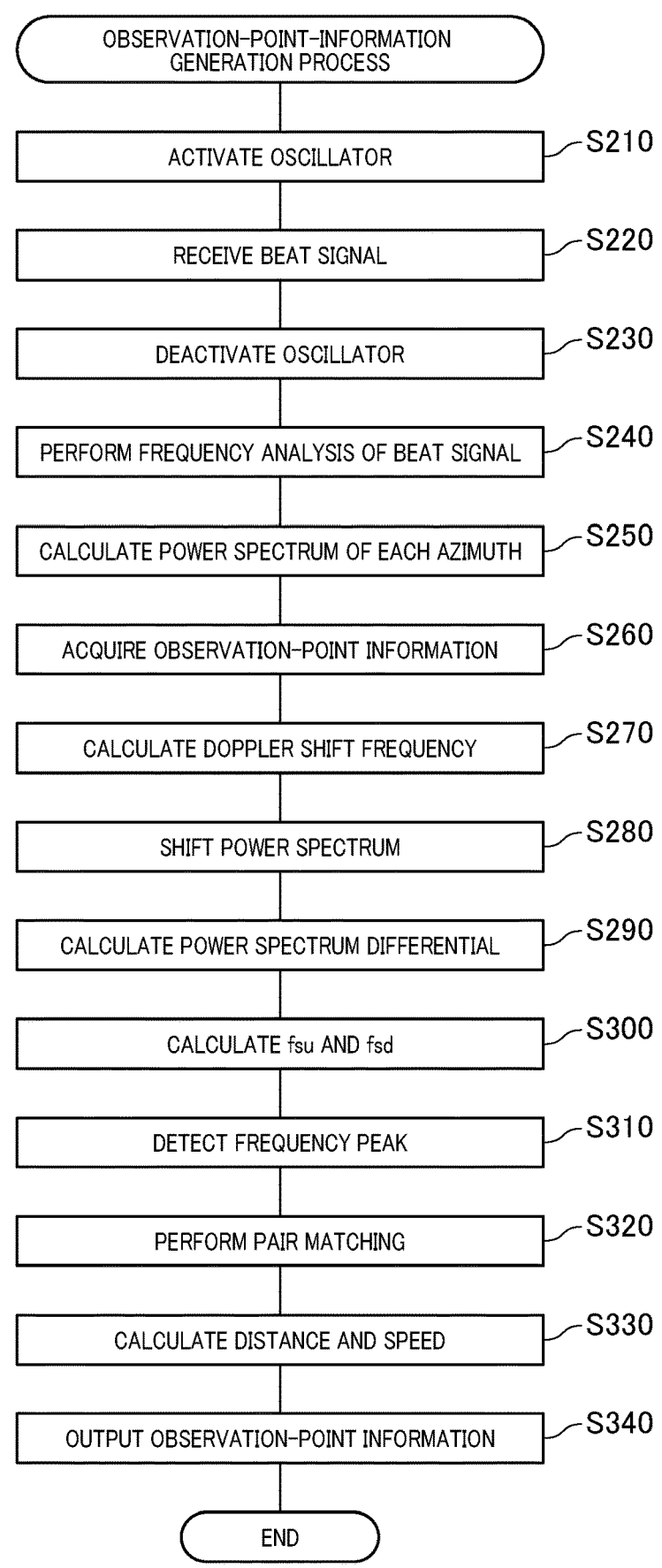
FIG. 6 is a flowchart illustrating an observation-point-information generation process performed by a signal processing unit 25.

As shown in FIG. 6, upon start of the observation-point-information generation process, the signal processing unit 25 activates the oscillator 31 first at S210 to start transmission of radar waves. Then, at S220, the signal processing unit 25 samples and acquires the beat signal BT1 outputted from the A/D converter 45 until lapse of one cycle which is constituted of an up-modulation time interval of gradually increasing frequency and a down-modulation time interval gradually decreasing frequency. Next, after lapse of one cycle constituted of the up- and down-modulation time intervals, the signal processing unit 25 deactivates, at S230, the oscillator 31 to stop transmission of radar waves.

Then, at S240, the signal processing unit 25 executes a frequency analysis process for the sampled data acquired at S220 to calculate a power spectrum of the beat signal BT1 for each of the up- and down-modulation time intervals and for each of the reception channels CH1 to CHn. These power spectra each indicate a frequency contained in the beat signal BT1 and the intensity at the frequency. In the present embodiment, the frequency analysis process corresponds to a Fast Fourier Transform.

Figure 7:
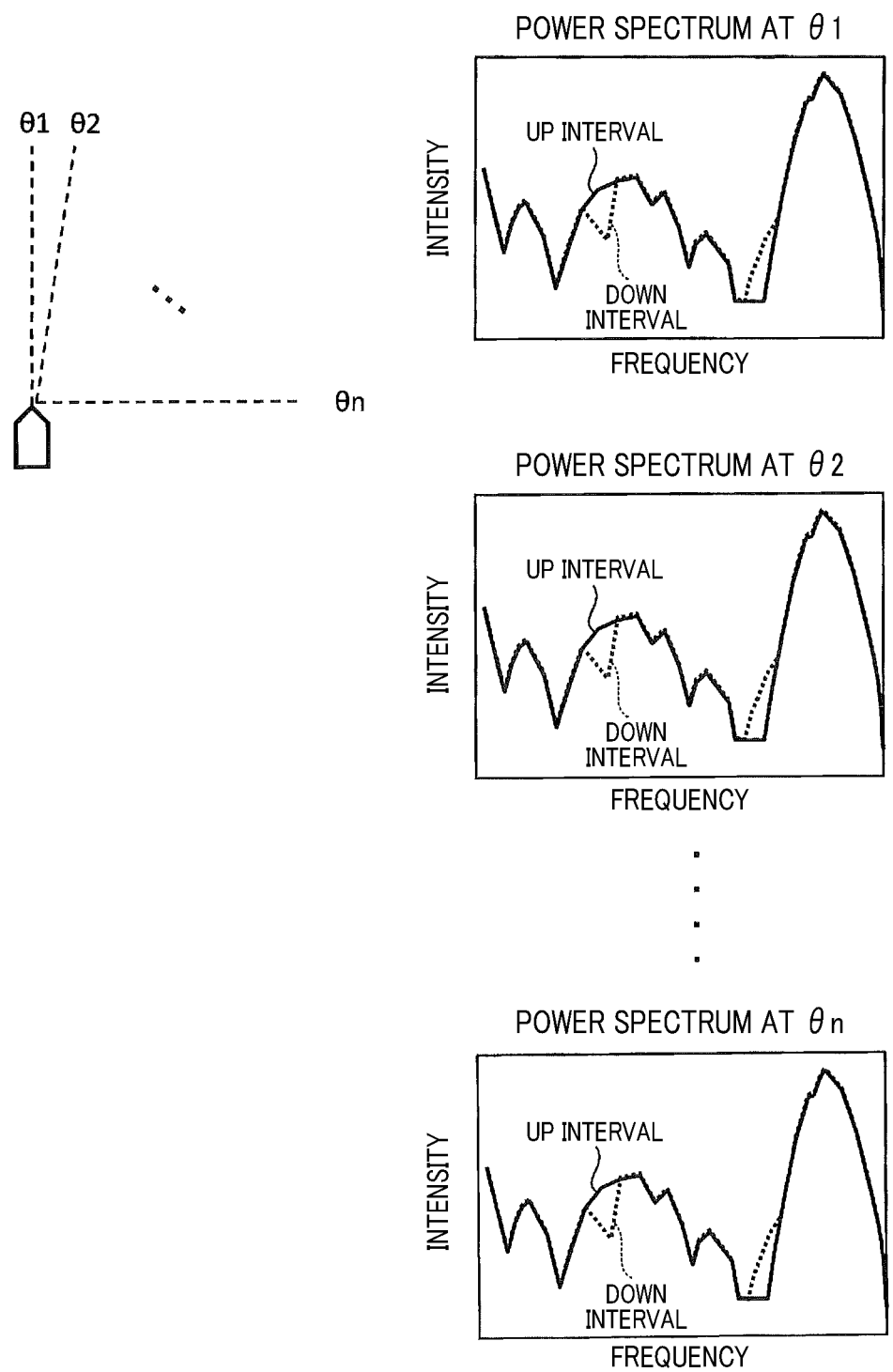
FIG. 7 shows a set of diagrams each illustrating a power spectrum in terms of observation-point orientation and up- and down-modulation time intervals.

Further, at S250, using the power spectra obtained at S240, the signal processing unit 25 calculates, as shown in FIG. 7, the power spectra of the beat signal BT1 for each of up- and down-modulation time intervals and for each of observation-point orientations. The observation-point orientations are each calculated, for example, using a digital beamforming technique. FIG. 7 shows that the power spectrum of up- and down-modulation time intervals is calculated for each of orientations θ1, θ2, . . . and θn. It should be noted that n of θn is an integer.

After completing the processing of S250, the signal processing unit 25 acquires at S260, as shown in FIG. 6, observation-point information from the signal processing unit 65 of the dual-frequency CW processing unit 12. Further, at S270, the signal processing unit 25 calculates a Doppler shift frequency fΔ using the following Equation (7). In the Equation (7), θ is an angle formed between the observation-point orientation indicated by the observation-point information acquired at S260 and an advancing direction of the own vehicle, f0 is the center frequency of the radar waves transmitted by the FMCW processing unit 11 as described above, and v is the traveling speed of the own vehicle. In the Equation (7), an arbitrary frequency within the frequency range of the radar waves transmitted by the FMCW processing unit 11 may be set instead of the center frequency f0.

$$f\Delta = 2 \times f0 \times v \times \cos \theta / c \quad (7)$$

Figure 8:
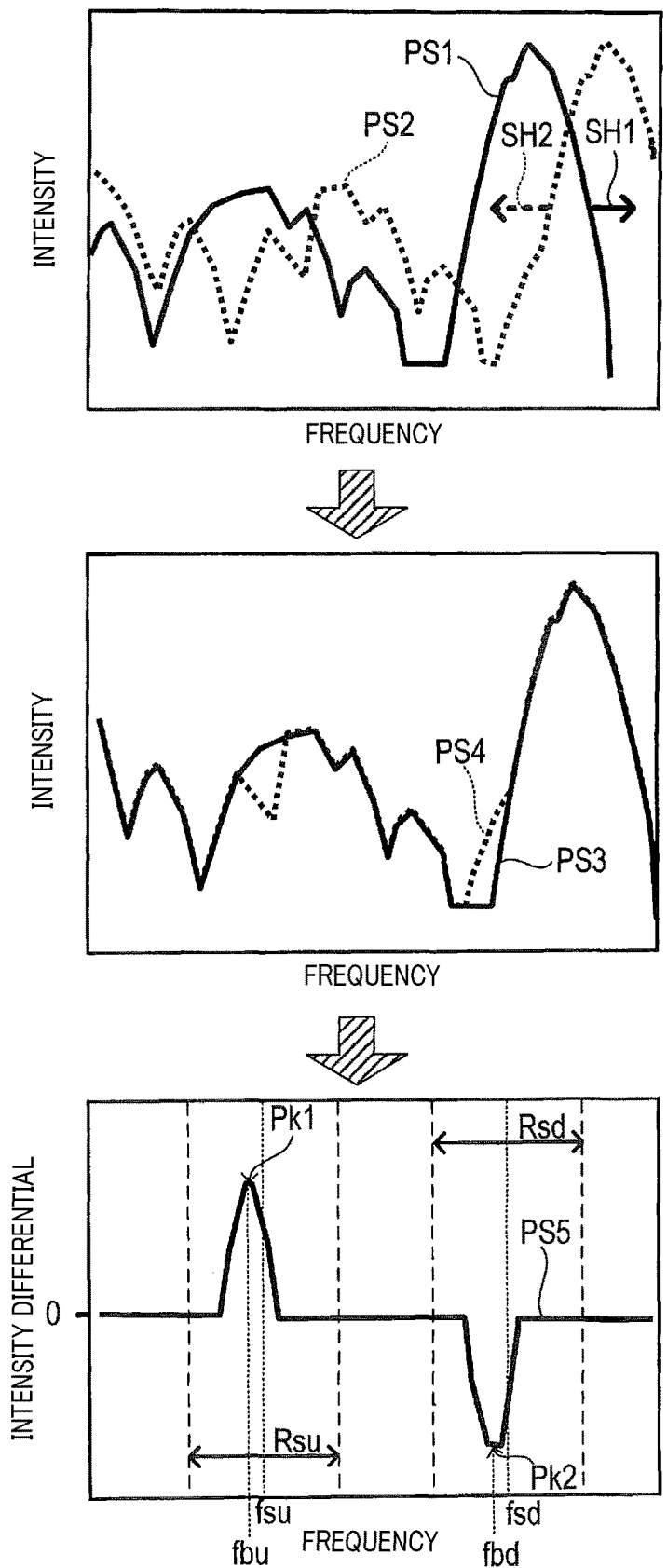
FIG. 8 shows a set of graphs illustrating power spectrum shifting and differential.

Then, as shown in FIG. 8, the signal processing unit 25 shifts at S280 the power spectrum of the beat signal BT1 of the up-modulation time interval relating to the observation-point orientation indicated by the observation-point information acquired at S260, along the frequency axis by an amount corresponding to the Doppler shift frequency f$\Delta$. Likewise, the signal processing unit 25 shifts the power spectrum of the beat signal BT1 of the down-modulation time interval relating to the observation-point orientation indicated by the observation-point information acquired at S260, along the frequency axis by an amount corresponding to the Doppler shift frequency f$\Delta$.

In FIG. 8, the power spectrum PS1 corresponds to the power spectrum of the up-modulation time interval relating to the observation-point orientation indicated by the observation-point information acquired at S260. The power spectrum PS2 corresponds to the power spectrum of the down-modulation time interval in the observation-point orientation indicated by the observation-point information acquired at S260. Further, as indicated by the arrow SH1, the signal processing unit 25 shifts the power spectrum PS1 of the up-modulation time interval in the positive direction, and as indicated by the arrow SH2, shifts the power spectrum PS2 of the down-modulation time interval in the negative direction.

The power spectrum PS3 of FIG. 8 corresponds to the power spectrum PS1 of the up-modulation time interval being shifted in the positive direction by the Doppler shift frequency f$\Delta$. Likewise, the power spectrum PS4 corresponds to the power spectrum PS2 of the down-modulation time interval being shifted in the negative direction by the Doppler shift frequency f$\Delta$.

After completing the processing of S280, the signal processing unit 25 calculates at S290, as shown in FIG. 6, a differential between the power spectrum of the up-modulation time interval after being shifted in the positive direction by an amount corresponding to the Doppler shift frequency f$\Delta$, and the power spectrum of the down-modulation time interval after being shifted in the negative direction by an amount corresponding to the Doppler shift frequency f$\Delta$. The power spectrum calculated by differentiation at S290 is referred to as a differential power spectrum. The power spectrum PS5 of FIG. 8 corresponds to the differential power spectrum calculated by differentiating the power spectrum PS3 of the up-modulation time interval and the power spectrum PS4 of the down-modulation time interval.

After completing the processing of S290, the signal processing unit 25 calculates at S300, as shown in FIG. 6, an up-search center frequency fsu and a down-search center frequency fsd. The up-search center frequency fsu is calculated by substituting the observation-point distance, as L, indicated by the observation-point information acquired at S260, and the observation-point relative speed, as v, indicated by the observation-point information acquired at S260, into the right-hand side of the Equation (1). Likewise, the down-search center frequency fsd is calculated by substituting L and v into the right-hand side of the Equation (2).

Then, at S310, the signal processing unit 25 detects frequency peaks from the differential power spectrum calculated at S290. Specifically, the signal processing unit 25 detects a frequency peak which is within an up search range and has a search-frequency width that has been set in advance centering on the up-search center frequency fsu, and a frequency peak which is within a down search range and has the search-frequency width that has been set centering on the down-search center frequency fsd, Thus, the signal processing unit 25 detects, as an up peak frequency fbu, the frequency of the peak that is within the up search range, and detects, as a down peak frequency fbd, the frequency of the peak that is within the down search range.

FIG. 8 shows that, in the differential power spectrum PS5, the frequency peak Pk1 is in an up-search range Rsu centering on the up-search center frequency fsu, and the frequency peak Pk2 is in a down search range Rsd centering on the down-search center frequency fsd.

Then, at S320, the signal processing unit 25 performs pair matching of pairing an up-peak frequency fbu and a down peak frequency fbd relating to the same observation point. Specifically, the signal processing unit 25 determines whether the difference in peak intensity and the difference in angle of the observation-point orientation are in the respective preset allowable ranges, for the up and down peak frequencies fbu and fbd that have been paired. If it is determined that the difference in peak intensity and the difference in angle of the observation-point orientation are both in the respective preset allowable ranges, the signal processing unit 25 registers the pair of these peak frequencies as a peak pair.

Then, at S330, the signal processing unit 25 calculates the observation-point distance and the observation-point relative speed of the registered peak pair using a technique known in the field of FMCW radar devices.

Then, at S340, the signal processing unit 25 outputs observation-point information indicating the observation-point distance, the observation-point relative speed, and the observation-point orientation to the warning device 2, and then temporarily terminates the observation-point-information generation process.

Based on the observation-point information inputted from the radar devices 3, 4, 5, and 6, and the traveling speed and other information of the own vehicle, the warning device 2 calculates a time-to-collision TTC. It should be noted that TTC is an abbreviation of time to collision. Then, if the time-to-collision TTC is shorter than a preset warning-determination time, the warning device 2 determines that there is a risk of collision, and issues warning to the occupants of the own vehicle.

The radar devices 3, 4, 5, and 6 of the vehicle warning system 1 configured as described above are installed in a vehicle, and detect observation points around the vehicle.

The transmission circuit 21 and the transmission antenna 22 of each of the radar devices 3 to 6 transmit radar waves whose frequency has been modulated such that a preset modulation cycle Tm includes an up-modulation time interval of gradually increasing frequency over time, and a down-modulation time interval of gradually decreasing frequency over time.

The reception antenna 23 and the reception circuit 24 receive radar waves transmitted from the transmission antenna 22 and reflected at the observation point, and mix the received radar waves with radar waves to be transmitted to a generate beat signal BT1.

The signal processing unit 25 analyzes the beat signal BT1 generated by the reception circuit 24 to calculate power spectra each indicating correlation between the frequency contained in the beat signal BT1 and the intensity of the frequency.

The transmission circuit 61 and the transmission antenna 62 transmit the radar waves whose frequency has been modulated such that the preset modulation cycle includes the first modulation time interval in which the frequency is set to the first modulation frequency f1, and the second modulation time interval in which the frequency is set to the second modulation frequency f2.

The reception antenna 63 and the reception circuit 64 receive radar waves transmitted from the transmission antenna 62 and reflected at the observation point, and mix the received radar waves with radar waves to be transmitted to generate a beat signals BT2.

The signal processing unit 65 analyzes the beat signal BT2 generated by the reception circuit 64 to calculate power spectra each indicating correlation between the frequency contained in the beat signal BT2 and the intensity of the frequency.

Using the calculated power spectra, the signal processing unit 65 calculates an observation-point orientation of the observation point.

Based on the traveling speed of the vehicle and the observation-point orientation calculated by the signal processing unit 65, the signal processing unit 65 calculates a Doppler shift frequency $f\Delta$ using the Equation (7).

Using the power spectra calculated by the signal processing unit 25, the signal processing unit 25 calculates at least the power spectra of the beat signal BT1 in terms of up- and down-modulation time intervals, based on the radar waves arrived from the observation-point orientation calculated by the signal processing unit 65 (termed orientation power spectra hereinafter).

The signal processing unit 25 shifts the orientation power spectrum of the up-modulation time interval in the positive direction by an amount corresponding to the calculated Doppler shift frequency $f\Delta$, and shifts the orientation power spectrum of the down-modulation time interval in the negative direction by an amount corresponding to the Doppler shift frequency $f\Delta$.

The signal processing unit 25 calculates a differential power spectrum that is obtained by differentiating the shifted orientation power spectrum of the up-modulation time interval, and the shifted orientation power spectrum of the down-modulation time interval.

The signal processing unit 25 detects a peak frequency at which the intensity is maximum in the calculated differential power spectrum.

In this way, in each of the radar devices 3 to 6, the radar waves reflected at the observation point are received by the dual-frequency CW processing unit 12, and an observation-point orientation of the observation point of reflecting the radar waves is calculated using the power spectra of the beat signal BT2. Thus, the radar devices 3 to 6 can each specify the orientation of the observation point of reflecting the radar waves transmitted from the FMCW processing unit 11. Thus, even when each of the radar devices 3 to 6 calculates a power spectrum indicating correlation between a frequency contained in the beat signal BT1 and the intensity of the frequency, for each of the plurality of orientations different from each other, each of the radar devices 3 to 6 only needs to shift the power spectrum of the calculated observation-point orientation (i.e., the orientation power spectrum) by an amount corresponding to the Doppler shift frequency $f\Delta$. In this way, the radar devices 3 to 6 can reduce the processing load of detecting a moving object.

Further, the signal processing unit 65 in each of the radar devices 3 to 6 calculates the own-vehicle-speed frequencies fv1 and fv2 of the beat signal BT2, which correspond to the traveling speed of the own vehicle. Then, in the power spectra of the beat signal BT2, the signal processing unit 65 detects a peak frequency of maximizing the intensity in the range of frequencies higher than the calculated own-vehicle-speed frequencies fv1 and fv2 to thereby detect an observation point. Thus, each of the radar devices 3 to 6 can exclude in advance stationary observation points and observation points receding from the own vehicle to detect an observation point approaching the own vehicle. As a result, the processing load of detecting an observation point can be reduced.

Further, the signal processing unit 65 in each of the radar devices 3 to 6 calculates an observation-point orientation for the frequency peak detected in the range of frequencies higher than the calculated own-vehicle-speed frequencies fv1 and fv2. Thus, each of the radar devices 3 to 6 can exclude in advance stationary observation points and observation points receding from the own vehicle to calculate an observation-point orientation of the observation point approaching the own vehicle. As a result, the processing load of detecting an observation orientation can be reduced.

Further, the signal processing unit 65 in each of the radar devices 3 to 6 calculates an observation-point distance and an observation-point relative speed using the calculated power spectra. Then, the signal processing unit 25 calculates an up-search center frequency fsu of the beat signal BT1 corresponding to an observation-point distance and an observation-point relative speed, in the orientation power spectrum of the up-modulation time interval. Further, the signal processing unit 25 calculates a down-search center frequency fsd of the beat signals BT1 corresponding to an observation-point distance and an observation-point relative speed in the orientation power spectrum of the down-modulation time interval.

Further, in the differential power spectrum, the signal processing unit 25 detects peak frequencies in the up-search range near the calculated up-search center frequency fsu and in the down search range near the calculated down-search center frequency fsd.

Thus, each of the radar devices 3 to 6 can narrow the search ranges of detecting peak frequencies, and hence can reduce the processing load of detecting peak frequencies.

In the embodiment described above, the transmission circuit 21 and the transmission antenna 22 correspond to the first transmission unit, the reception antenna 23 and the reception circuit 24 correspond to the first reception unit, and S240 corresponds to the processing as the first-spectrum calculation unit.

Further, the transmission circuit 61 and the transmission antenna 62 correspond to the second transmission unit, the reception antenna 63 and the reception circuit 64 correspond to the second reception unit, and S40 corresponds to the processing as the second-spectrum calculation unit.

Further, S70 corresponds to the processing as the orientation calculation unit, S270 corresponds to the processing as the shift amount calculation unit, and S250 corresponds to the processing as the orientation-spectrum calculation unit.

Further, S280 corresponds to the processing as the shifting unit, S290 corresponds to the processing as the differential spectrum calculation unit, and S310 corresponds to the processing as the peak detection unit.

Further, the observation point corresponds to the object, the modulation cycle Tm corresponds to the first modulation cycle, the radar waves transmitted from the FMCW processing unit 11 correspond to the first radar waves, the beat signal BT1 corresponds to the first beat signal, and the power spectrum calculated at S240 corresponds to the first power spectrum.

Further, the modulation cycle in the dual-frequency CW processing unit 12 corresponds to the second modulation cycle, the radar waves transmitted from the dual-frequency CW processing unit 12 correspond to the second radar waves, the beat signal BT2 correspond to the second beat signal, the power spectrum calculated at S40 corresponds to second power spectrum, the observation-point orientation corresponds to the object orientation, and the Doppler shift frequency fΔ corresponds to the shift amount.

Further, S50 corresponds to the processing as the vehicle-speed-frequency calculation unit, S60 corresponds to the processing as the object detection unit, S80 corresponds to the processing as the distance/speed calculation unit, and S300 corresponds to the processing as the corresponding-frequency calculation unit.

Further, the observation-point distance corresponds to the object distance, the observation-point relative speed corresponds to the object relative speed, the up-search center frequency fsu corresponds to the up corresponding frequency, and the down-search center frequency fsd corresponds to the down corresponding frequency.

Further, the up-search range corresponds to the range of frequencies near the up corresponding frequency, and the down search range corresponds to the range of frequencies near the down corresponding frequency.

An embodiment of the present disclosure has been described so far. However, the present disclosure should not be construed as being limited to the above-described embodiment, but may be implemented in various modifications.

[Modification 1]

For example, in the above-described embodiment, at S250, the power spectrum of the beat signal BT1 is calculated for each observation-point orientation and for each up/down modulation time interval. However, after acquiring the observation-point information from the dual-frequency CW processing unit 12, only the power spectrum of the up/down down-modulation time interval in the observation-point orientation indicated by the acquired observation-point information may be calculated using the power spectra obtained at S240.

Further, the function of a single component in the above-described embodiment may be distributed to a plurality of components, or functions of a plurality of components may be exerted by a single component. Further, part of the configuration of the above-described embodiment may be omitted. Further, at least part of the configuration of the above-described embodiment may be, for example, added to or replaced with other parts of the configuration of the above-described embodiment. It should be noted that all the modes included in the technical idea as specified by the wording of the claims should be encompassed by the present disclosure.

Besides the radar devices 3 to 6 described above, the present disclosure may also be implemented in various modes, including a system provided with the radar devices 3 to 6 as components, a program for causing a computer to function as the radar devices 3 to 6, a medium storing this program, an object detection method, or other modes.

The invention claimed is:

1. A radar device that is installed in a vehicle to detect at least an object around the vehicle, comprising:
a first transmission unit configured to transmit first radar waves that are modulated in frequency so that a preset first-modulation cycle includes an up-modulation time interval for gradually increasing frequency over time, and a down-modulation time interval for gradually decreasing frequency over time;
a first reception unit configured to receive the first radar waves transmitted from the first transmission unit and reflected by the object and generate a first beat signal by mixing the received first radar waves with the first radar waves transmitted by the first transmission unit;
a first-spectrum calculation unit configured to perform frequency analysis of the first beat signal generated by the first reception unit to calculate a first power spectrum indicating correlation between a frequency contained in the first beat signal and intensity of the frequency;
a second transmission unit configured to transmit second radar waves that are modulated in frequency so that a preset second-modulation cycle includes a first modulation time interval with a frequency set to a first modulation frequency, and a second modulation time interval with a frequency set to a second modulation frequency;
a second reception unit configured to receive the second radar waves transmitted from the second transmission unit and reflected by the object and generate a second beat signal by mixing the received second radar waves with the second radar waves transmitted by the second transmission unit;
a second-spectrum calculation unit configured to perform frequency analysis of the second beat signal generated by the second reception unit to calculate a second power spectrum indicating correlation between a frequency contained in the second beat signal and intensity of the frequency;
an orientation calculation unit configured to use the second power spectrum generated by the second-spectrum calculation unit as a basis to calculate an object orientation of the object that has reflected the second radar waves;
a shift amount calculation unit configured to calculate a shift amount in frequency due to Doppler effect, based on a traveling speed of the vehicle and the object orientation calculated by the orientation calculation unit;
an orientation-spectrum calculation unit 2 configured to use the first power spectrum calculated by the first-spectrum calculation unit as a basis to calculate at least an orientation power spectrum for each of the up-modulation time interval and the down-modulation time interval, the orientation power spectrum indicating correlation between a frequency contained in the first beat signal and intensity of the frequency, the first beat signal having been generated based on the first radar waves arrived from the object orientation calculated by the orientation calculation unit;
a shifting unit configured to shift the orientation power spectrum of the up-modulation time interval calculated by the orientation-spectrum calculation unit in a positive frequency direction by an amount corresponding to the shift amount calculated by the shift amount calculation unit, and shift the orientation power spectrum of the down-modulation time interval calculated by the orientation-spectrum calculation unit in a negative frequency direction by an amount corresponding to the shift amount calculated by the shift amount calculation unit;
a differential spectrum calculation unit configured to calculate a differential power spectrum obtained by differentiating the orientation power spectrum of the up-modulation time interval after being shifted by the shifting unit and the orientation power spectrum of the down-modulation time interval after being shifted by the shifting unit; and a peak detection unit configured to detect a peak frequency of maximizing intensity in the differential power spectrum calculated by the differential spectrum calculation unit.

2. The radar device according to claim 1, wherein the orientation calculation unit includes:

a vehicle-speed-frequency calculation unit configured to calculate a vehicle speed frequency that is a frequency of the second beat signal and corresponds to the traveling speed of the vehicle; and an object detection unit configured to detect the object by detecting, in the second power spectrum, a peak frequency where intensity is maximum in a range of frequencies higher than the vehicle speed frequency calculated by the vehicle-speed-frequency calculation unit.

3. The radar device according to claim 2, wherein the orientation calculation unit calculates the object orientation of the object detected by the object detection unit.

4. The radar device according to claim 1, further comprising:

a distance/speed calculation unit configured to use the second power spectra calculated by the second-spectrum calculation unit as a basis to calculate an object distance between the object that has reflected the second radar waves and the vehicle, and an object relative speed between the object that has reflected the second radar waves and the vehicle; and a corresponding-frequency calculation unit configured to calculate an up corresponding frequency that is a frequency of the first beat signal in the orientation power spectrum of the up-modulation time interval, and corresponding to the object distance and the object relative speed calculated by the distance/speed calculation unit, and to calculate a down corresponding frequency that is a frequency of the first beat signal in the orientation power spectrum of the down-modulation time interval, and corresponding to the object distance and the object relative speed calculated by the distance/speed calculation unit, wherein the peak detection unit detects the peak frequency in the differential power spectrum, in a range of frequencies near the up corresponding frequency calculated by the corresponding-frequency calculation unit, and in a range of frequencies near the down corresponding frequency calculated by the corresponding-frequency calculation unit.

5. The radar device according to claim 2, further comprising:

a distance/speed calculation unit configured to use the second power spectra calculated by the second-spectrum calculation unit as a basis to calculate an object distance between the object that has reflected the second radar waves and the vehicle, and an object relative speed between the object that has reflected the second radar waves and the vehicle; and a corresponding-frequency calculation unit configured to calculate an up corresponding frequency that is a frequency of the first beat signal in the orientation power spectrum of the up-modulation time interval, and corresponding to the object distance and the object relative speed calculated by the distance/speed calculation unit, and to calculate a down corresponding frequency that is a frequency of the first beat signal in the orientation power spectrum of the down-modulation time interval, and corresponding to the object distance and the object relative speed calculated by the distance/speed calculation unit, wherein the peak detection unit detects the peak frequency in the differential power spectrum, in a range of frequencies near the up corresponding frequency calculated by the corresponding-frequency calculation unit, and in a range of frequencies near the down corresponding frequency calculated by the corresponding-frequency calculation unit.

6. The radar device according to claim 3, further comprising:

a distance/speed calculation unit configured to use the second power spectra calculated by the second-spectrum calculation unit as a basis to calculate an object distance between the object that has reflected the second radar waves and the vehicle, and an object relative speed between the object that has reflected the second radar waves and the vehicle; and a corresponding-frequency calculation unit configured to calculate an up corresponding frequency that is a frequency of the first beat signal in the orientation power spectrum of the up-modulation time interval, and corresponding to the object distance and the object relative speed calculated by the distance/speed calculation unit, and to calculate a down corresponding frequency that is a frequency of the first beat signal in the orientation power spectrum of the down-modulation time interval, and corresponding to the object distance and the object relative speed calculated by the distance/speed calculation unit, wherein the peak detection unit detects the peak frequency in the differential power spectrum, in a range of frequencies near the up corresponding frequency calculated by the corresponding-frequency calculation unit, and in a range of frequencies near the down corresponding frequency calculated by the corresponding-frequency calculation unit.

* * * * *